(12) United States Patent  
Tong et al.

(10) Patent No.: US 9,199,656 B1  
(45) Date of Patent: Dec. 1, 2015

(54) SHOPPING CART STORAGE SYSTEM

(71) Applicants: Jason Tong, Antioch, CA (US);  
Pornpun Boonyasub, Antioch, CA (US)

(72) Inventors: Jason Tong, Antioch, CA (US);  
Pornpun Boonyasub, Antioch, CA (US)

( * ) Notice: Subject to any disclaimer, the term of this patent is extended or adjusted under 35 U.S.C. 154(b) by 0 days.

(21) Appl. No.: 14/457,752

(22) Filed: Aug. 12, 2014

(51) Int. Cl.  
*B62B 3/18* (2006.01)  
*B62B 3/10* (2006.01)

(52) U.S. Cl.  
CPC .. *B62B 3/102* (2013.01); *B62B 3/18* (2013.01)

(58) Field of Classification Search  
CPC ........ B62B 3/1472; B62B 3/102; B62B 3/14; B62B 3/18; Y10S 224/927  
USPC .............. 280/33.991, 33.992, 33.994, 33.997  
See application file for complete search history.

(56) References Cited

U.S. PATENT DOCUMENTS

| | | | | |
|---|---|---|---|---|
| 2,916,291 | A * | 12/1959 | Young | 280/33.991 |
| 4,678,195 | A * | 7/1987 | Trubiano | 280/33.992 |
| D346,473 | S * | 4/1994 | Hubble | D34/19 |
| 5,553,876 | A * | 9/1996 | Trubiano | 280/33.991 |
| 5,806,861 | A * | 9/1998 | Lipschitz et al. | 280/33.992 |
| 6,641,147 | B2 | 11/2003 | Werner | |
| D484,666 | S * | 12/2003 | Caya | D34/27 |
| D536,502 | S | 2/2007 | Weigand et al. | |
| 7,185,898 | B2 | 3/2007 | Cote et al. | |
| 7,192,035 | B1 * | 3/2007 | Lioce | 280/33.992 |
| 8,313,114 | B1 | 11/2012 | Aron | |
| 2003/0052464 | A1 * | 3/2003 | McGuire | 280/33.992 |
| 2005/0212234 | A1 | 9/2005 | McFarland | |
| 2006/0049591 | A1 | 3/2006 | Pennell | |
| 2007/0029745 | A1 | 2/2007 | Ursettie | |
| 2007/0235961 | A1 * | 10/2007 | Clair | 280/33.994 |
| 2009/0160145 | A1 * | 6/2009 | Deal et al. | 280/33.992 |

FOREIGN PATENT DOCUMENTS

DE 202011100766 U1 * 3/2012 ............... B62B 3/00  
WO WO0107312 2/2001

* cited by examiner

*Primary Examiner* — Joseph Rocca  
*Assistant Examiner* — Bridget Avery

(57) ABSTRACT

A shopping cart storage system allows a user to easily transport elongated items throughout a store. The system includes a shopping cart having a frame, a basket and a plurality of wheels. The basket and the wheels are coupled to the frame. The frame includes a lower bar spaced below the basket. An upper retaining member is coupled to the basket. The upper retaining member has an open top end and an open bottom end. A lower retaining member is coupled to the lower rail. The lower retaining member has a bottom wall and a perimeter wall coupled to and extending upwardly from the bottom wall. The lower retaining member is spaced from and vertically aligned with the upper retaining member wherein the upper and lower retaining members are configured to retain an elongated object in an upright position adjacent to the shopping cart.

17 Claims, 10 Drawing Sheets

SHOPPING CART STORAGE SYSTEM

BACKGROUND OF THE DISCLOSURE

Field of the Disclosure

The disclosure relates to shopping cart devices and more particularly pertains to a new shopping cart device for allowing a user to easily transport elongated items, such as fluorescent lights, PVC pipes or the like in a shopping cart throughout a store.

SUMMARY OF THE DISCLOSURE

An embodiment of the disclosure meets the needs presented above by generally comprising a shopping cart having a frame, a basket and a plurality of wheels. The basket and the wheels are coupled to the frame. The frame includes a lower bar spaced below the basket. An upper retaining member is coupled to the basket. The upper retaining member has an open top end, an open bottom end and a peripheral wall coupled to and extending between the open top end and the open bottom end. A lower retaining member is coupled to the lower rail. The lower retaining member has a bottom wall and a perimeter wall coupled to and extending upwardly from the bottom wall. The lower retaining member is spaced from and vertically aligned with the upper retaining member wherein the upper and lower retaining members are configured to retain an elongated object in an upright position adjacent to the shopping cart.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 11 thereof, a new shopping cart device embodying the principles and concepts of an embodiment of the disclosure and generally designated by the reference numeral 10 will be described.

As best illustrated in FIGS. 1 through 11, the shopping cart storage system 10 generally comprises a shopping cart 12 that may be of a generally conventional design. The shopping cart 12 has a frame 14, a basket 16 coupled to and supported by the frame 14, and a plurality of wheels 18, casters or the like each coupled to the frame 14 and configured to facilitate transportation of the shopping cart 12 on a ground surface. The frame 14 includes a lower rail 22 spaced below the basket 16. The basket 16 includes a plurality of spaced horizontal rods 24 and a plurality of spaced vertical rods 26 coupled to and extending between the horizontal rods 24 wherein the basket 16 has a plurality of openings 20 extending therein.

An upper retaining member 28 is coupled to the basket 16 such that the upper retaining member 28 extends away from the basket 16. The upper retaining member 28 has an open top end 32, an open bottom end 34 and a peripheral wall 35 coupled to and extending between the open top end 32 and the open bottom end 34. The upper retaining member 28 has a front side 36, a rear side 38 and a pair of lateral sides 40, 42 coupled to and extending between the front side 36 and the rear side 38. The rear side 38 of the upper retaining member 28 may include a first section 44 spaced from a second section 46 defining a void 48 extending therebetween.

As shown in FIGS. 6-11, the peripheral wall 35 of the upper retaining member 28 may include a plurality of spaced horizontal bars 50 and a plurality of spaced vertical bars 52 that are welded together. Each of the vertical bars 52 is coupled to and extends between the horizontal bars 50. Alternatively, as shown in FIGS. 1-5, the peripheral wall 35 may be solid such that it includes no openings.

An upper coupler 54 is coupled to the upper retaining member 28. The upper coupler 54 couples the upper retaining member 28, and more particularly, the rear side 38 of the upper retaining member 28, to the basket 16. The upper coupler 54 may comprise a pair of upper clips 56, 58.

A lower retaining member 60 is coupled to the lower rail 22 of the frame 14. The lower retaining member 60 has a bottom wall 62 and a perimeter wall 64 coupled to and extending upwardly from the bottom wall 62. The lower retaining member 60 is spaced from and vertically aligned with the upper retaining member 28 wherein the upper 28 and lower 60 retaining members are configured to retain an elongated object 66 in an upright position on the shopping cart 12. In particular, a lower end 67 of the elongated object 66 is supported on the bottom wall 62 and an upper end 69 of the elongated object 66 may be positioned above the upper retaining member 28 wherein the elongated object 66 extends through the open top end 32 and the open bottom end 34 of the upper retaining member 28. The perimeter wall 64 of the lower retaining member 60 includes a front section 68, a rear section 70 and a pair of lateral sections 72, 74 coupled to and extending between the front section 68 and the rear section 70. The rear section 70 may include a first free end 76 spaced from a second free end 78 defining a gap 80 therebetween. Each of the first free end 76 and the second free end 78 extends inwardly from an associated one of the lateral sections 72, 74 such that the first free end 76 and the second free end 78 extend toward each other.

As shown in FIGS. 6-11, the perimeter wall 64 of the lower retaining member 60 may include a plurality of spaced horizontal struts 82 and a plurality of spaced vertical struts 84 that are welded together. Each of the vertical struts 84 is coupled to and extends between the horizontal struts 82. Alternatively, as shown in FIGS. 1-5, the perimeter wall 64 may be solid such that it includes no openings. The bottom wall 62 of the lower retaining member 60 is solid between a top surface 86 and a bottom surface 88 of the bottom wall 62 so that the elongated object 66 does not inadvertently fall through the bottom wall 62. Each of the upper retaining member 28 and the lower retaining member 60 may be constructed from metal, plastic or a similar rigid material. In particular, the upper retaining member 28 and the lower retaining member of the version shown in FIGS. 1-5 may be produced through conventional plastic injection molding.

A lower coupler 90 couples the lower retaining member 60 to the lower rail 22 of the frame 14. The lower coupler 90 comprises a pair of lower clips 92, 94. Each of the lower clips 92, 94 is coupled to the rear section 70 of the lower retaining member 60. Each of the lower clips 92, 94 is configured to frictionally engage the lower rail 22 of the frame 14. An inner surface of each of the clips 92 may further include a plurality of teeth to provide an enhanced grip on the lower rail 22. Each of the lower clips 92, 94 is arcuate and has a break 96 positioned therein to receive the lower rail 22. The break 96 is positioned opposite of the lower retaining member 60.

Figure 1:
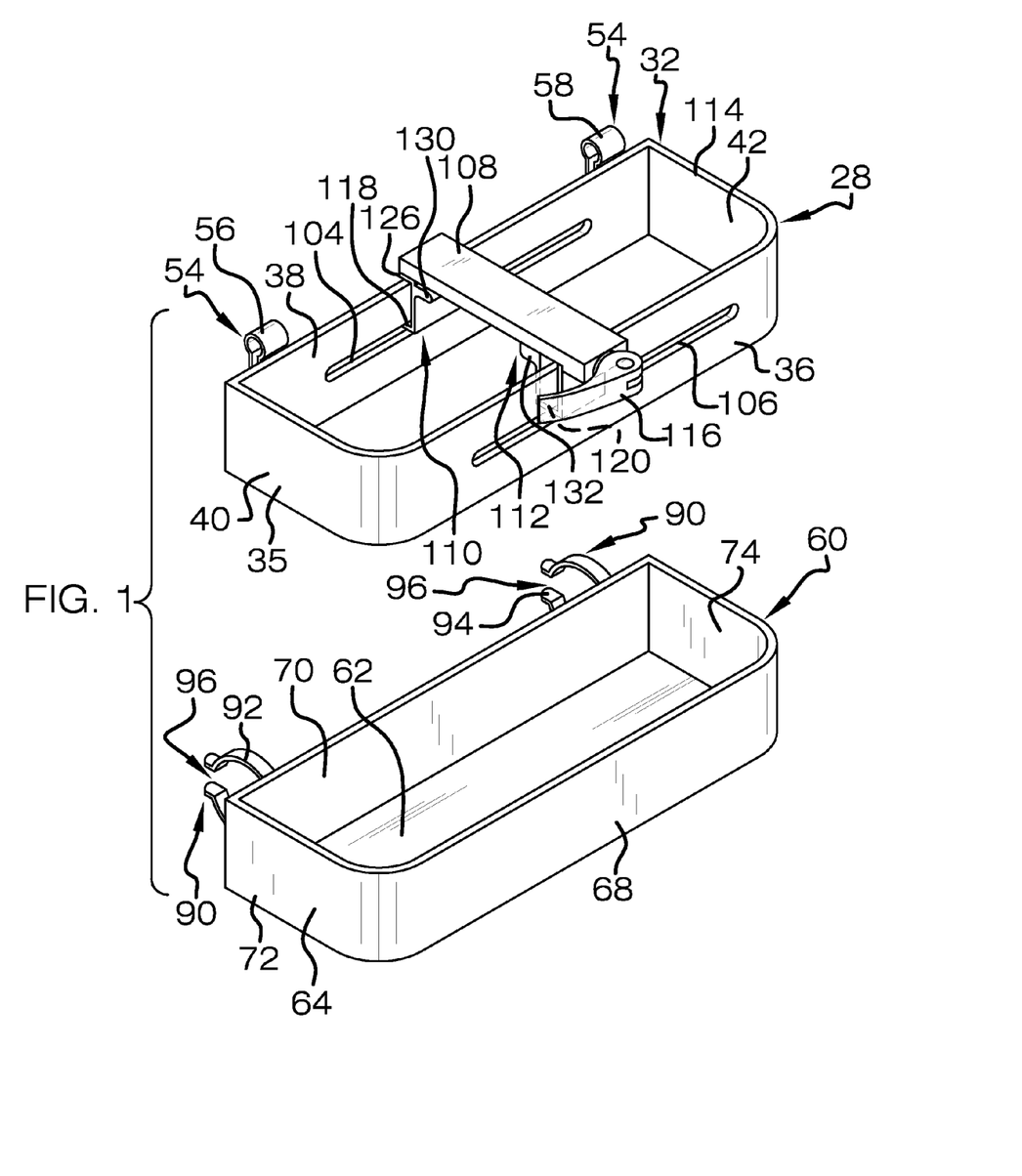
FIG. 1 is a top front side perspective view of an upper retaining member and a lower retaining member of the shopping cart storage system according to an embodiment of the disclosure.
Figure 2:
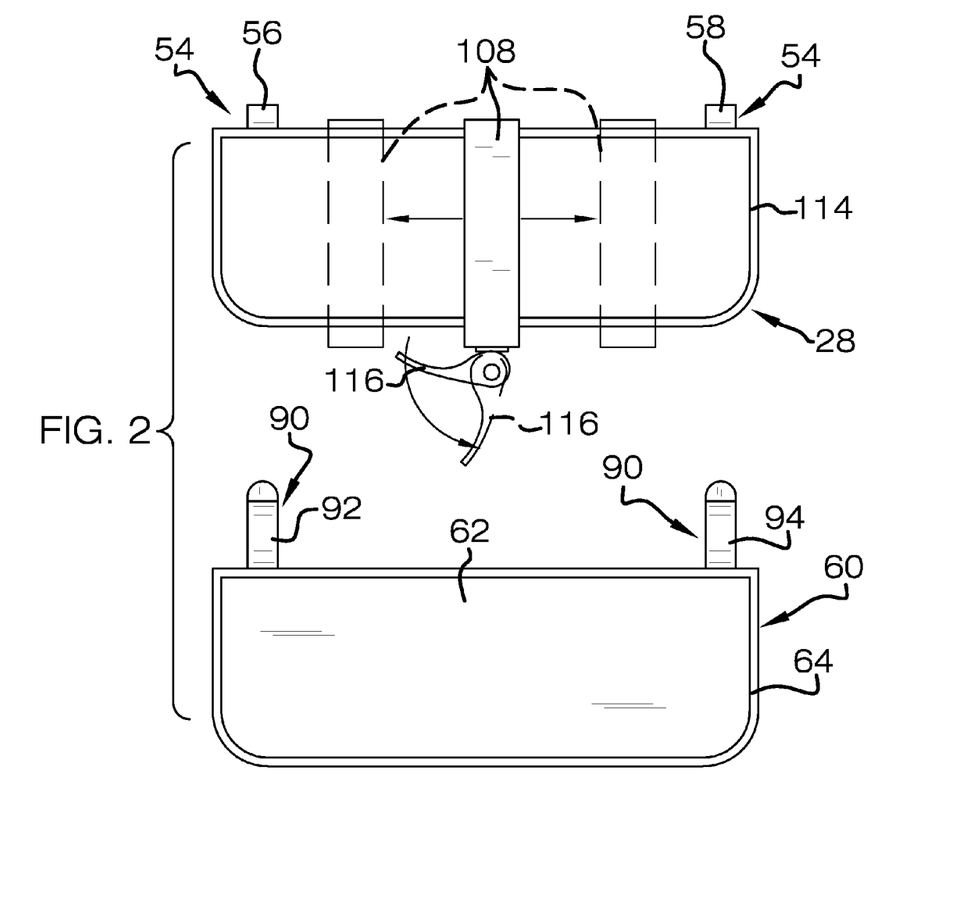
FIG. 2 is a top view of the upper and lower retaining members of an embodiment of the disclosure.
Figure 3:
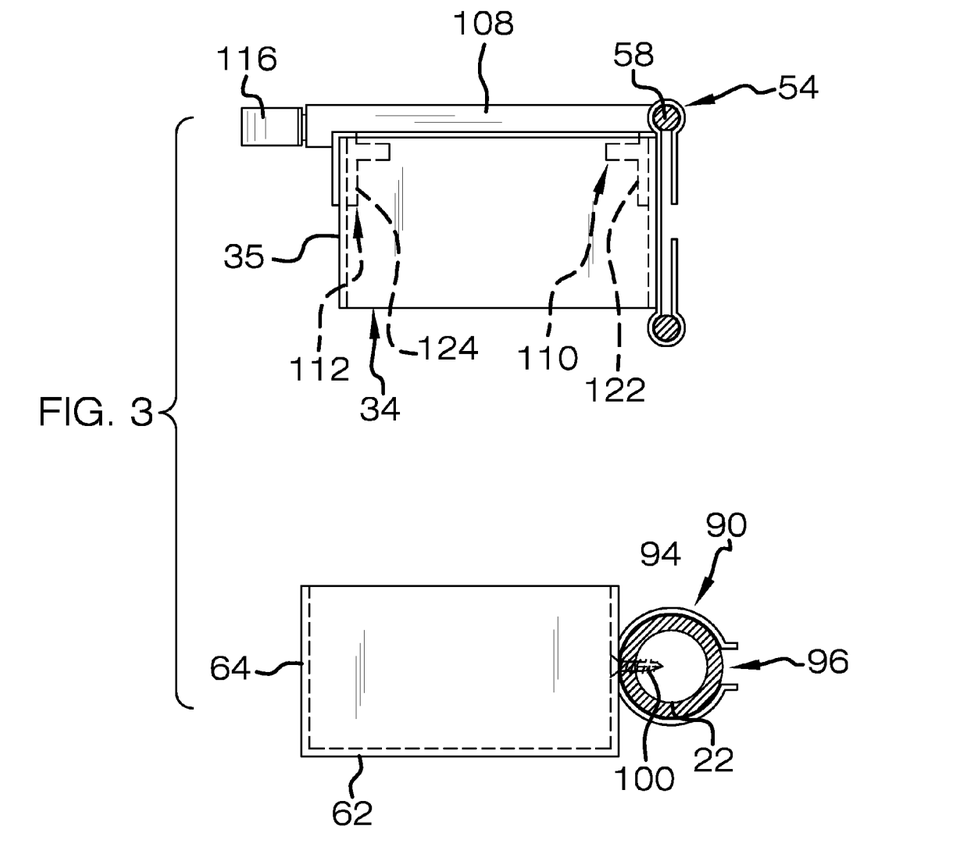
FIG. 3 is a side view of the upper and lower retaining members of an embodiment of the disclosure.
Figure 4:
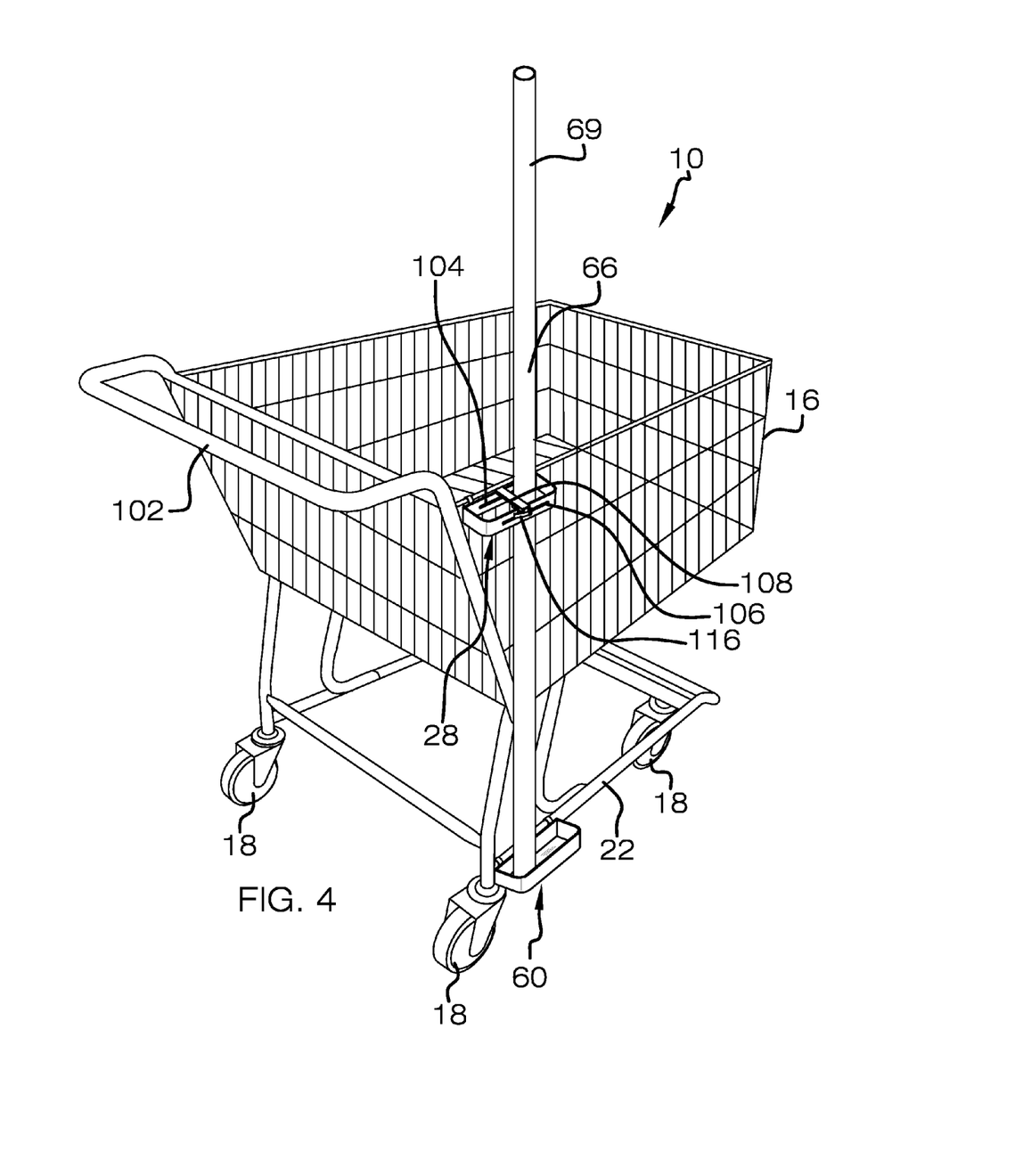
FIG. 4 is an in-use top perspective view of an embodiment of the disclosure.
Figure 5:
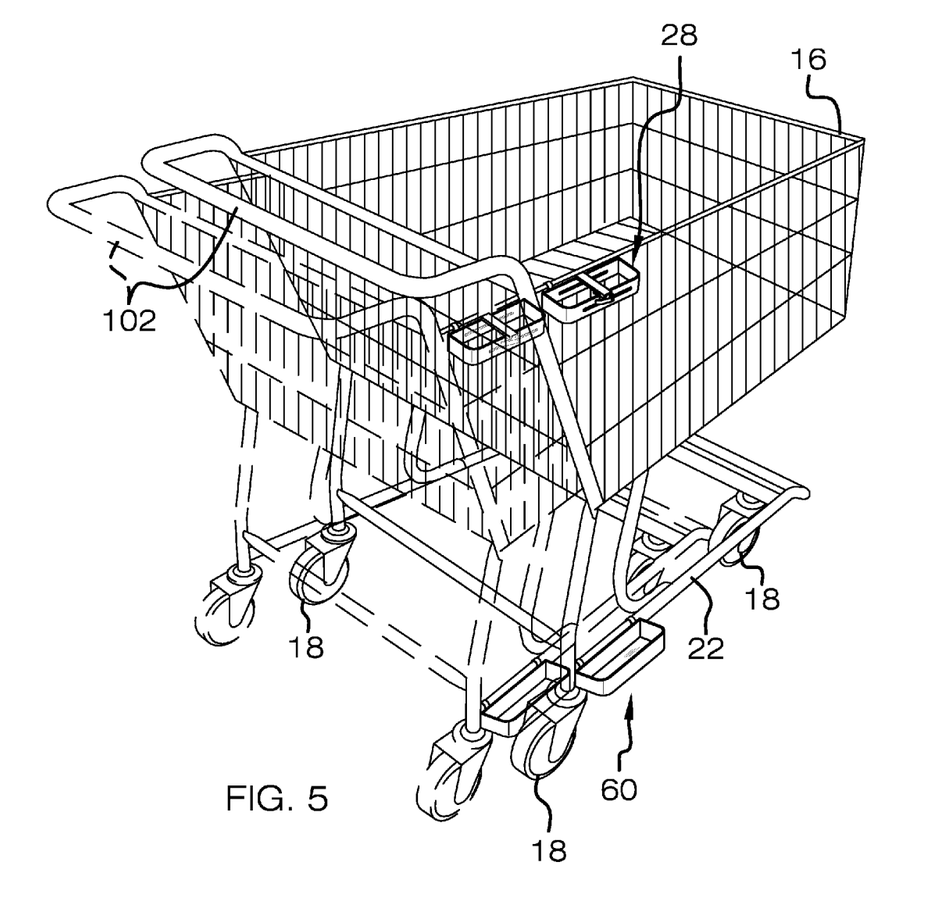
FIG. 5 is a top perspective view of an embodiment of the disclosure showing a pair of each of the upper and lower retaining members attached to an associated shopping cart while also showing the stackable nature of the shopping carts when the upper and lower retaining members are attached thereto.
Figure 6:
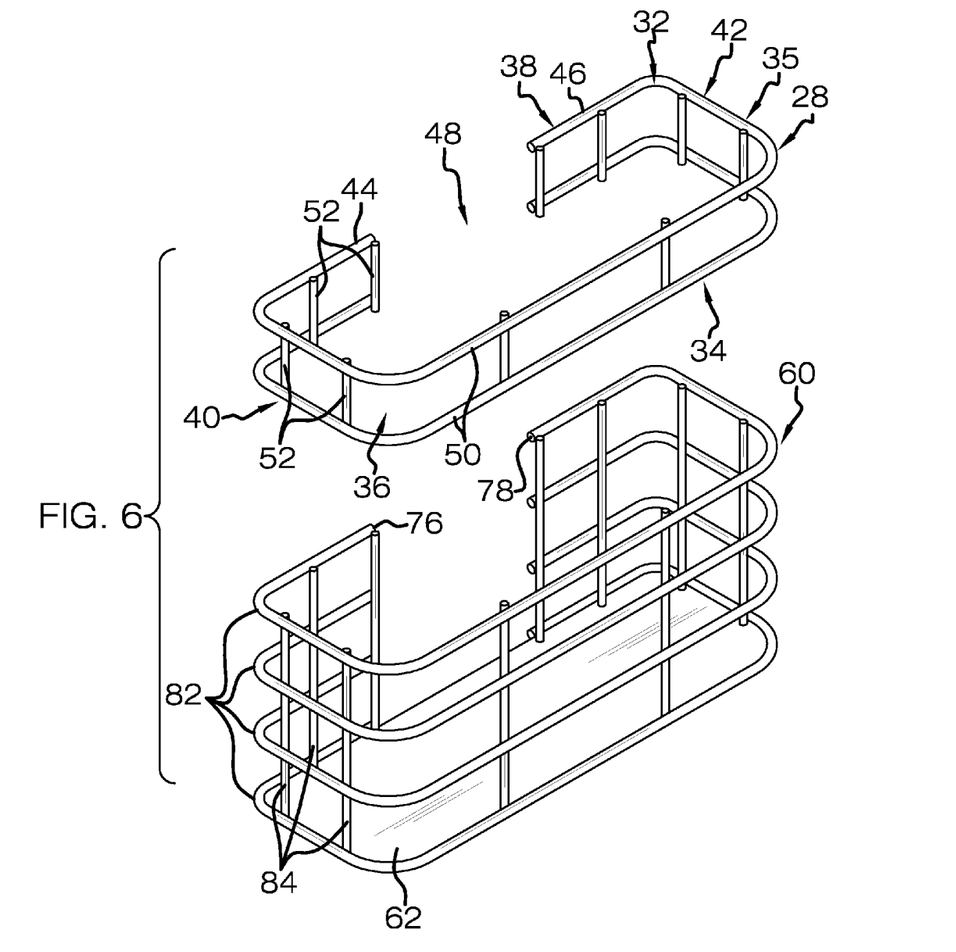
FIG. 6 is a top front side perspective view of the upper and lower retaining members of an alternative embodiment of the disclosure.
Figure 7:
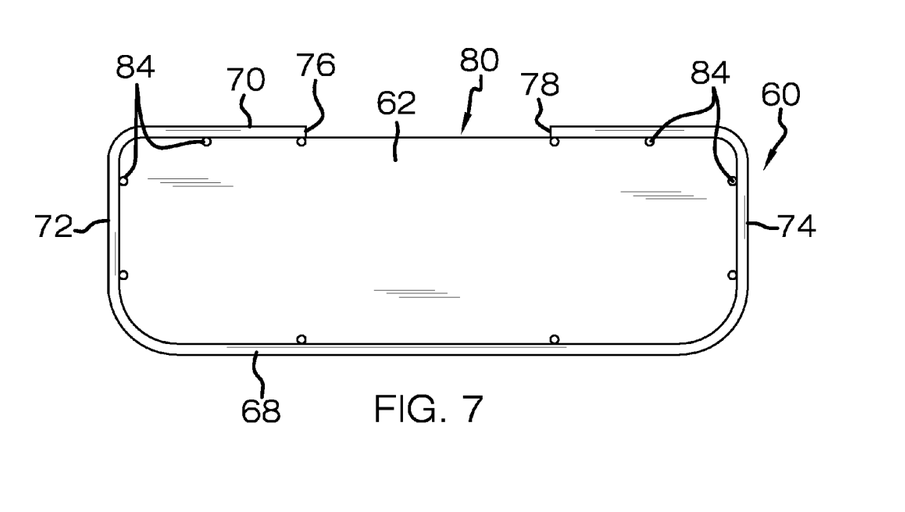
FIG. 7 is a top view of the upper retaining member of an alternative embodiment of the disclosure.
Figure 8:
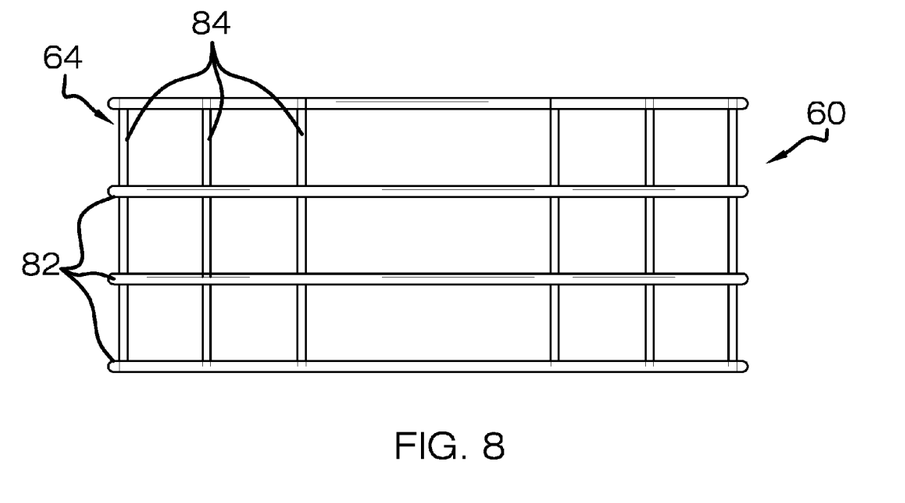
FIG. 8 is a front view of the lower retaining member of an alternative embodiment of the disclosure.
Figure 9:
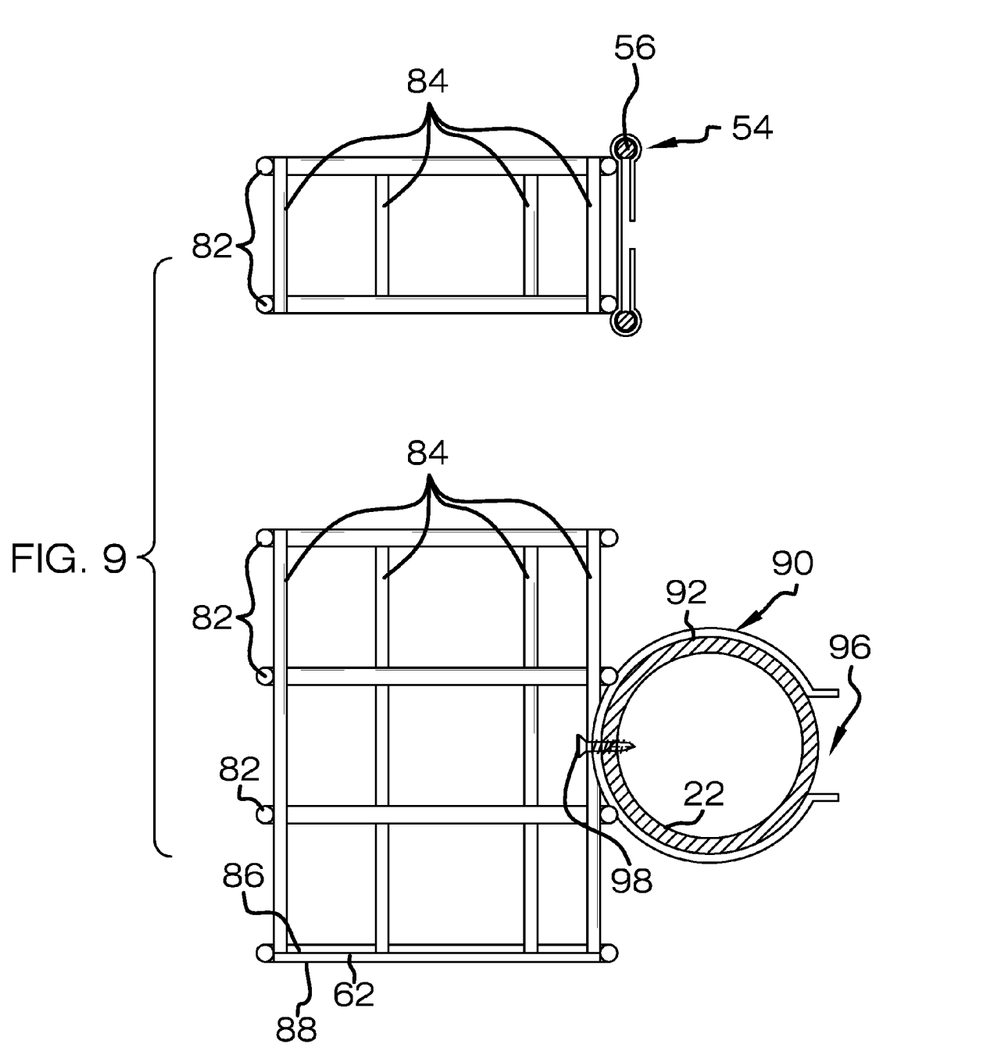
FIG. 9 is a side view the upper and lower retaining members of an alternative embodiment of the disclosure.
Figure 10:
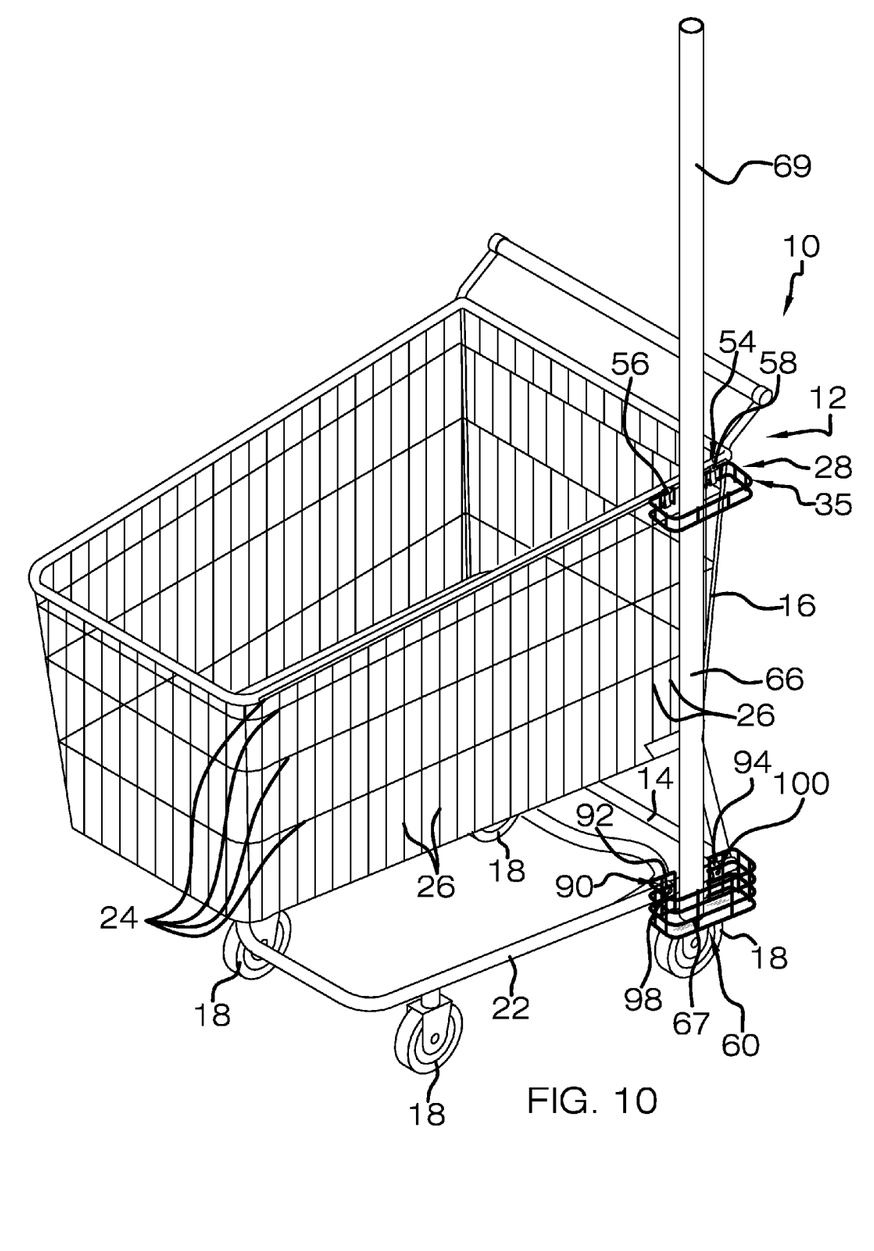
FIG. 10 is an in-use top perspective view of an alternative embodiment of the disclosure.
Figure 11:
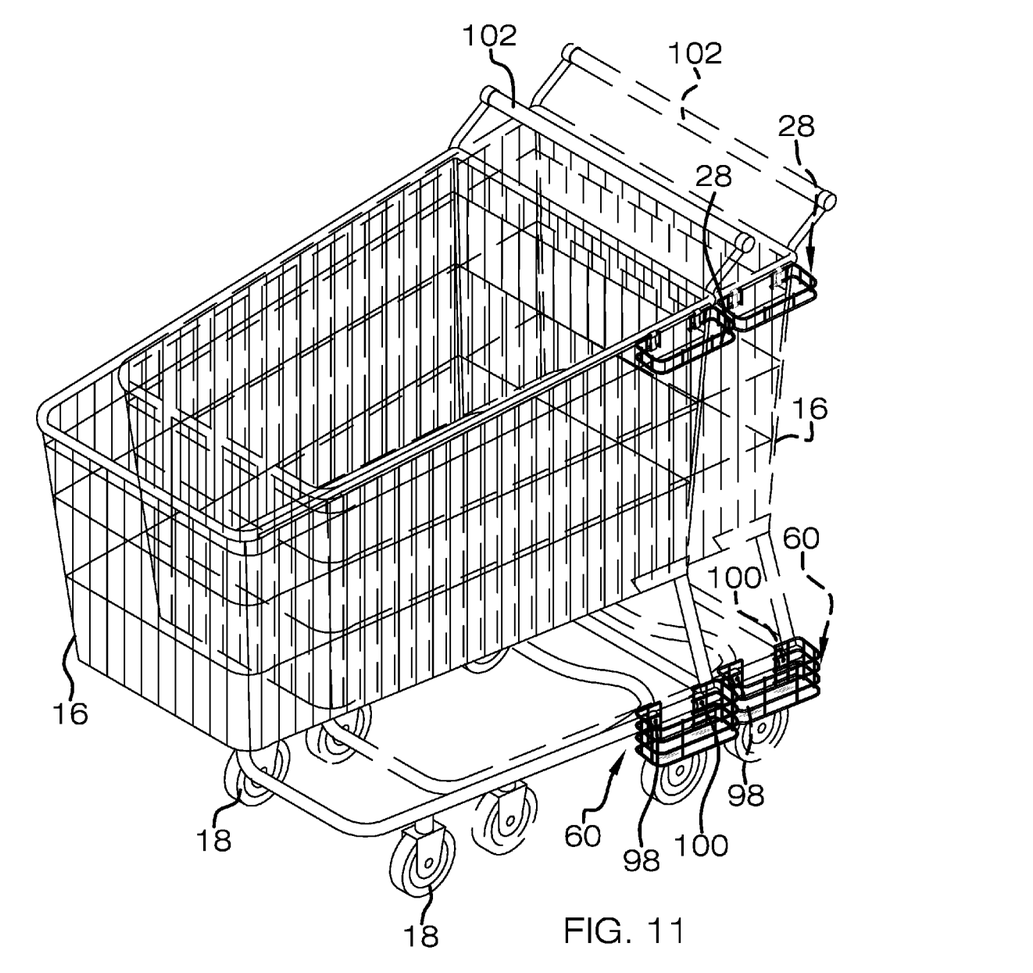
FIG. 11 is a top perspective view similar to FIG. 10, except that FIG. 11 shows a pair of shopping carts to illustrate the stackable nature of the shopping carts when the upper and lower retaining members are attached thereto.

The lower coupler 90 may further include a pair of fasteners 98, 100. Each of the fasteners 98, 100 extends into an associated one of the lower clips 92, 94 and engages the lower rail 22 to retain the lower retaining member 60 in a static position on the lower rail 22. Each of the fasteners 98, 100 may comprise a screw of conventional design. Each of the lower clips 92, 94 may alternatively be attached to the lower retaining member 60 through welding, an adhesive or the like. The lower coupler 90 and the upper coupler 54 allow the lower 60 and upper 28 retaining members, respectively, to be positioned on the shopping cart 12 where desired. However, in order to avoid interference with stacking of multiple shopping carts 12, the upper 28 retaining member may be positioned near a handle 102 of the shopping cart 12 while the lower retaining member 60 may be positioned near a rear one of the wheels 18, as shown in FIGS. 5 and 11.

A pair of grooves 104, 106 each extends into an associated one of the front side 36 and the rear side 38 of the upper retaining member 28. A panel 108 is provided and has a pair of tabs 110, 112 each attached thereto. Each of the tabs 110, 112 includes a lower flange 118, 120 that slidably engages an associated one of the pair of grooves 104, 106 so that the panel 108 is slidably coupled to the upper retaining member 28. The panel 108 may abut a top edge 114 of the peripheral wall 35. Each of the tabs 110, 112 further includes a main body 122, 124 coupled to an associated one of the lower flanges 118, 120 and an upper flange 126 spaced from the associated lower flanges 118, 120 and coupled to the main body 122, 124. The lower flanges 118, 120 extend in a same direction as the associated upper flange 126 and are orientated parallel with respect to each other. The upper flanges 126 each engage the top edge 114 of the peripheral wall 35. Each of the tabs 110, 112 may also include a projection 130, 132 coupled to the associated main body 122, 124 and extending in a direction opposite the upper 126 and lower 118, 120 flanges.

A locking mechanism 116 is attached to the panel 108 and selectively restricts movement of the panel 108 along a length of the upper retaining member 28. The locking mechanism 116 may comprise a lever lock of conventional design which relies on compression to achieve a locked position.

The upper retaining member 28 may have a length extending between the lateral sides 40, 42 between approximately 14.0 cm and 22.0 cm; a height from the open top end 32 to the open bottom end 34 between approximately 1.0 cm and 4.0 cm; and a width from the front side 36 to the rear side 38 between approximately 3.0 cm and 8.0 cm. The lower retaining member 60 may have a length extending between the lateral sections 72, 74 between approximately 14.0 cm and 22.0 cm; a height from the bottom wall 62 to an uppermost one of the horizontal struts 82 between approximately 5.0 cm and 10.0 cm; and a width between the lateral sections 72, 74 between approximately 3.0 cm and 8.0 cm.

In use, as stated above and shown in the Figures, the upper retaining member 28 is attached to the basket 16 where desired using upper clips 56, 58. The lower retaining member 60 is positioned below and is vertically aligned with the upper retaining member 28. The upper retaining member 28 is then attached to the lower rail 22 using the lower clips 92, 94. One or more elongated objects 66, such as PVC pipes, fluorescent lights, or the like, are inserted through the upper retaining member 28 and supported upon the bottom wall 62 of the lower retaining member 60. In this manner, the system 10 allows a user to easily transport an elongated object 66 throughout a store without causing damage to the object 66, while also ensuring that the object 66 does not fall out of the shopping cart 12 and risk injuring another person. In the version shown in FIGS. 1-5, the panel 108 can be slid long a length of the upper retaining member 28 and locked into place using locking mechanism 116. This enables the panel 108 to abut the elongated object 66 and prevent the elongated object 66 from moving within the upper retaining member 28.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A shopping cart storage system comprising:
    a shopping cart having a frame, a basket and a plurality of wheels, said basket being coupled to and supported by said frame, said basket having a plurality of openings, each of said wheels being coupled to said frame and configured to facilitate transportation of said shopping cart on a ground surface, said frame including a lower rail spaced below said basket;
    an upper retaining member coupled to said basket, said upper retaining member having an open top end, an open bottom end and a peripheral wall coupled to and extending between said open top end and said open bottom end, said peripheral wall of said upper retaining member including a front side, a rear side and a pair of lateral sides coupled to and extending between said front side and said rear side;
    a lower retaining member coupled to said lower rail of said frame, said lower retaining member having a bottom wall and a perimeter wall coupled to and extending upwardly from said bottom wall, said lower retaining member being spaced from and vertically aligned with said upper retaining member wherein said upper and lower retaining members are configured to retain an elongated object in an upright position on the shopping cart, wherein said perimeter wall of said lower retaining member includes a front section, a rear section and a pair of lateral sections coupled to and extending between said front section and said rear section, wherein said bottom wall of said lower retaining member is solid between a top surface and a bottom surface of said bottom wall;
    a pair of grooves each extending into an associated one of said front side and said rear side of said upper retaining member; and
    a panel having a pair of tabs attached thereto, each of said tabs including a lower flange that slidably engages an associated one of said pair of grooves such that said panel is slidably coupled to said upper retaining member.

2. The system of claim 1, further comprising wherein said upper retaining member has a front side, a rear side and a pair of lateral sides coupled to and extending between said front side and said rear side, said rear side of said upper retaining member being coupled to said basket such that said upper retaining member extends away from said basket.

3. The system of claim 1, further comprising wherein said rear section includes a first free end spaced from a second free end defining a void therebetween, each of said first free end and said second free end extending inwardly from an associated one of said lateral sections such that said first free end and said second free end extend toward each other.

4. The system of claim 1, further comprising wherein said perimeter wall of said lower retaining member includes a plurality of spaced horizontal struts and a plurality of spaced vertical struts, each of said vertical struts being coupled to and extending between said horizontal struts.

5. The system of claim 1, further comprising an upper coupler coupled to said upper retaining member, said upper coupler coupling said upper retaining member to said basket.

6. The system of claim 1, further comprising a lower coupler coupling said lower retaining member to said lower rail of said frame.

7. The system of claim 1, further comprising a locking mechanism being attached to said panel for selectively restricting movement of said panel along a length of said upper retaining member.

8. The system of claim 2, further comprising wherein said rear side of said upper retaining member includes a first section spaced from a second section defining an opening extending therebetween.

9. The system of claim 2, further comprising wherein said peripheral wall of said upper retaining member includes a plurality of spaced horizontal bars and a plurality of spaced vertical bars, each of said vertical bars being coupled to and extending between said horizontal bars.

10. The system of claim 5, further comprising:
    said basket including a plurality of spaced horizontal rods and a plurality of spaced vertical rods coupled to and extending between said horizontal rods; and
    said upper coupler comprising a pair of upper clips, each of said upper clips extending around at least a pair of said horizontal rods and around said rear side of said upper retaining member for retaining said upper retaining member on said basket.

11. The system of claim 6, further comprising said lower coupler comprising a pair of lower clips, each of said lower clips being coupled to said rear section of said lower retaining member, each of said lower clips being configured to frictionally engage said lower rail of said frame.

12. The system of claim 7, further comprising said locking mechanism comprising a lever lock.

13. A shopping cart storage system comprising:
    a shopping cart having a frame, a basket and a plurality of wheels, said basket being coupled to and supported by said frame, said basket having a plurality of openings, each of said wheels being coupled to said frame and configured to facilitate transportation of said shopping cart on a ground surface, said frame including a lower rail spaced below said basket;
    an upper retaining member coupled to said basket, said upper retaining member having an open top end, an open bottom end and a peripheral wall coupled to and extending between said open top end and said open bottom end;
    a lower retaining member coupled to said lower rail of said frame, said lower retaining member having a bottom wall and a perimeter wall coupled to and extending upwardly from said bottom wall, said lower retaining member being spaced from and vertically aligned with said upper retaining member wherein said upper and lower retaining members are configured to retain an elongated object in an upright position on the shopping cart, wherein said perimeter wall of said lower retaining member includes a front section, a rear section and a pair of lateral sections; coupled to and extending between said front section and said rear section;
    a lower coupler coupling said lower retaining member to said lower rail of said frame, said lower coupler comprising a pair of lower clips, each of said lower clips being coupled to said rear section of said lower retaining member, each of said lower clips being configured to frictionally engage said lower rail of said frame; and
    each of said lower clips being arcuate and having a break positioned therein to receive said lower rail, said break being positioned opposite of said lower retaining member.

14. The system of claim 13, further comprising said lower coupler including a pair of fasteners, each of said fasteners extending into an associated one of said lower clips and engaging said lower rail to retain said lower retaining member in a static position on said lower rail.

15. A shopping cart storage system comprising:
a shopping cart having a frame, a basket and a plurality of wheels, said basket being coupled to and supported by said frame, said basket having a plurality of openings, each of said wheels being coupled to said frame and configured to facilitate transportation of said shopping cart on a ground surface, said frame including a lower rail spaced below said basket, said basket including a plurality of horizontal rods and a plurality of vertical rods coupled to and extending between said horizontal rods;
an upper retaining member coupled to said basket, said upper retaining member having an open top end, an open bottom end and a peripheral wall coupled to and extending between said open top end and said open bottom end, said upper retaining member having a front side, a rear side and a pair of lateral sides coupled to and extending between said front side and said rear side, said rear side of said upper retaining member including a first section spaced from a second section defining a void extending therebetween;
an upper coupler coupled to said upper retaining member, said upper coupler coupling said rear side of said upper retaining member to said basket such that said upper retaining member extends away from said basket, said upper coupler comprising a pair of upper clips;
a lower retaining member coupled to said lower rail of said frame, said lower retaining member having a bottom wall and a perimeter wall coupled to and extending upwardly from said bottom wall, said lower retaining member being spaced from and vertically aligned with said upper retaining member wherein said upper and lower retaining members are configured to retain an elongated object in an upright position on the shopping cart, said perimeter wall of said lower retaining member including a front section, a rear section and a pair of lateral sections coupled to and extending between said front section and said rear section, said rear section including a first free end spaced from a second free end defining a gap therebetween, each of said first free end and said second free end extending inwardly from an associated one of said lateral sections such that said first free end and said second free end extend toward each other, said bottom wall of said lower retaining member being solid between a top surface and a bottom surface of said bottom wall;

a lower coupler coupling said lower retaining member to said lower rail of said frame, said lower coupler comprising a pair of lower clips, each of said lower clips being coupled to said rear section of said lower retaining member, each of said lower clips being configured to frictionally engage said lower rail of said frame, each of said lower clips being arcuate and having a break positioned therein to receive said lower rail, said break being positioned opposite of said lower retaining member, said lower coupler including a pair of fasteners, each of said fasteners extending into an associated one of said lower clips and engaging said lower rail to retain said lower retaining member in a static position on said lower rail.

16. The system of claim 15, further comprising:
said peripheral wall of said upper retaining member including a plurality of horizontal bars and a plurality of vertical bars, each of said vertical bars being coupled to and extending between said horizontal bars; and
said perimeter wall of said lower retaining member including a plurality of horizontal struts and a plurality of vertical struts, each of said vertical struts being coupled to and extending between said horizontal struts.

17. The system of claim 15, further comprising:
a pair of grooves each extending into an associated one of said front side and said rear side of said upper retaining member;
a panel having a pair of tabs attached thereto, each of said tabs including a lower flange that slidably engages an associated one of said pair of grooves such that said panel is slidably coupled to said upper retaining member, said panel abutting a top edge of said peripheral wall, each of said tabs further including a main body coupled to an associated one of said lower flanges and an upper flange spaced from said associated lower flange and coupled to said associated main body, said lower flanges each extending in a same direction as said associated upper flange and each being orientated parallel with respect to each other, each of said tabs further including a projection coupled to said associated main body and extending in a direction opposite said upper and lower flanges; and
a locking mechanism being attached to said panel for selectively restricting movement of said panel along a length of said upper retaining member, said locking mechanism comprising a lever lock.

* * * * *